United States Patent [19]

Lucke

[11] Patent Number: 4,795,760

[45] Date of Patent: Jan. 3, 1989

[54] SINGLE COMPONENT POLYURETHANE-MODIFIED BITUMEN COMPOSITIONS

[75] Inventor: Heinz Lucke, Heidelberg, Fed. Rep. of Germany

[73] Assignee: Teroson GmbH, Heidelberg, Fed. Rep. of Germany

[21] Appl. No.: 134,408

[22] Filed: Dec. 17, 1987

[30] Foreign Application Priority Data

Jan. 3, 1987 [DE] Fed. Rep. of Germany ....... 3700100

[51] Int. Cl.$^4$ .................................................. C08J 9/00
[52] U.S. Cl. ........................................ 521/83; 521/98; 521/101; 521/137; 524/59; 524/62
[58] Field of Search ................ 524/62, 59; 521/83, 521/101, 137, 98

[56] References Cited

U.S. PATENT DOCUMENTS

| 3,179,610 | 4/1965 | Wood | 521/101 |
| 3,257,336 | 6/1966 | Levy et al. | 521/83 |
| 4,225,678 | 9/1980 | Roy | 521/101 |
| 4,255,527 | 3/1981 | Roy | 521/101 |
| 4,511,679 | 4/1985 | Ariyoshi | 521/83 |
| 4,609,695 | 9/1986 | Cogliano | 521/83 |
| 4,737,524 | 4/1988 | Ako | 521/101 |

FOREIGN PATENT DOCUMENTS 1207008 1/1959 France.
1323884 5/1973 United Kingdom.

OTHER PUBLICATIONS

"Teer und Peck", G. Collin/M. Zander, Rugezrswerke AG in Ullmanns Enzyklopadie der Technischen Chemie, Fourth Edition, Weinhim, 1982, vol. 22, pp. 411–455.
Encyclopedia of Polymer Scienced and Technology, New York–London–Sydney, 1965, vol. 2, p. 423.
"Bitumen" by K. H. Gusfeldt, Deutsche Shell AG in Ullmanns Enzyklopadie der Technischen Chemie, Fourth Edition, Weinheim 1974, vol. 8, pp. 527–547.

Primary Examiner—Morton Foelak
Attorney, Agent, or Firm—Vincent L. Fabiano; William W. McDowell, Jr.

[57] ABSTRACT

A liquid, solvent-free or low-solvent hardenable polyurethane-modified bitumen composition is described, which is based on a bitumen modified with a polyurethane prepolymer. The compatibility between bitumen and polyurethane prepolymer is achieved by a plasticizer system comprising a primary and a secondary plasticizer. The inventive composition is particularly suitable as an adhesive, sealant, foam material or coating compound.

9 Claims, No Drawings

SINGLE COMPONENT POLYURETHANE-MODIFIED BITUMEN COMPOSITIONS

BACKGROUND OF THE INVENTION

The invention relates to a liquid, solvent-free or low-solvent hardenable polyurethane-bitumen-plasticizer-one-component composition, a process for the production thereof and the use thereof.

Bitumens are extremely complex mixtures which mainly comprise polycyclic hydrocarbons and oxygen compounds. A clear distinction must be made between the terms bitumen and asphalt and the terms tar and pitch (cf. DIN 55 946). According to the relevant literature (e.g. "Bitumen" by K. H. Gusfeldt, Deutsche Shell AG in Ullmanns Enzyklopadie der Technischen Chemie, fourth edition, Weinheim 1974, vol. 8, pp 527 to 541) bitumens are the dark-coloured, semisolid to brittle, meltable, high molecular weight hydrocarbon mixtures obtained during the careful processing of crude oils and the natural asphalt fraction soluble in carbon disulphide ($CS_2$). A distinction is made between different bitumen types, such as distillate bitumen, blown bitumen, high vacuum bitumen and cut-back bitumen.

Within the scope of the present invention the term bitumen also covers asphalts, which are mixtures of bitumen and mineral subtances. Such asphalts are e.g. asphalt concrete, cast asphalt, asphalt mastic and natural asphalts, which are naturally occurring mixtures of bitumen and mineral substances.

As stated hereinbefore, tars and pitches are not covered by the present invention. Tars are liquid to semisolid products obtained through decomposing thermal treatment of organic natural substances (<700° C.: low temperature tars; 900° to 1300° C.: high temperature tars) which are designated as a function of the origin of the natural substance, e.g. coal tars, lignite tars, wood tars, peat tars and oil shale tars. Tars are generally dark to black viscous liquids with low proportions of emulsified water and dispersed carbon-rich solid particles entrained during formation (so-called tar sediments).

Pitches, however, are the residue of tar distillation. As a function of their origin, distinction is made between coal tar pitches, petroleum pitches, tall oil pitches, fish oil pitches, etc. Pitches are generally dark to black thermoplastic subtances with a broad molecular weight range (i.e. so-called multicomponent mixtures of higher molecular weight components).

Another way to distinguish between bitumens/asphalts and tars/pitches is provided by their toxicology. As opposed to coal tar, bitumen or asphalt contains no carcinogenic polycyclic hydrocarbons. By definition tars and pitches are produced by decomposing heat treatment at temperatures above 500° C. (see above). During the pyrolysis of organic materials carcinogenic polycyclic aromatic hydrocarbons form at temperatures above 500° C. At least 20 such different powerful carcinogens have already been detected in tars and pitches. The most powerful carcinogens from among the polycyclic aromatic hydrocarbons have been found in the case of compounds with 5 or more benzene rings, e.g. benzopyrene. In the case of high temperature tars (>1000° C.) inter alia there is also a formation of 7,12-dimethyl-benzanthracene, which animal experiments have shown to be highly carcinogenic. Tars and pitches also contain 2-naphthylamine, a well-known carcinogenic substance (cf. e.g. "Teer und Pech", G. Collin/M. Zander, Rutgerswerke AG in Ullmanns Enzyklopadie der Technischen Chemie, fourth edition, Weinheim, 1982, vol. 22, pp 411 to 455).

Whereas tars and pitches are considered carcinogenic substances, bitumens and asphalts are non-carcinogenic. In this connection it is pointed out that the literature often does not logically adhere to the above clearly defined restriction between the terms bitumen/asphalt and tar/pitch. Thus, e.g. reference is sometimes made to bituminous materials, without clearly defining this term, because it is frequently intended to cover tars and pitches. According to the invention only bitumen (including asphalt) is to be used, whereas tars and pitches are expressly excluded.

Bitumens have in general a very good resistance to water and weather. Thus, products based on such bitumens have long been used as water and weather-resistant mastics, paints, road coverings, corrosion-preventing varnishes, coating compounds, etc.

As bitumen-containing systems in the unmodified state and in particular under varying climatic conditions, particularly under the action of heat and cold, either soften (in the case of heat) or embrittle (in the case of cold) as a result of their thermoplastic ductility (deformability), attempts have been made to modify such bitumen-containing systems so as to avoid the disadvantages linked with the ductility.

Numerous bitumen modifications have been considered and in part also used, such as e.g. modifications of 1. bitumen-mineral oil,
2. bitumen-wax,
3. bitumen-elastomer (e.g. NR, SBR, EPDM, etc.), and
4. bitumen-polymer (e.g. PE, PP, ethylene copolymers, etc.)

The proportion of the modification component was generally well below that of the bitumen, whereas the polyurethane proportion in the inventive composition is essentially the same as the bitumen proportion, i.e. the weight ratio of the polyurethane modification component to the bitumen is preferably 50:50.

The aforementioned conventional bitumen modifications generally led to a certain improvement in the thermoplastic ductility of the bitumen fraction, but the mainly thermoplastic nature of such modified bitumen systems was largely retained.

Bitumen-polyurethane or polyurethane-bitumen modifications, particularly with liquid polyurethane prepolymers, are not known. There are several different reasons for this. One of the reasons is the known incompatibility of polyurethane prepolymers with bitumen, particularly in solvents, the discovery of suitable solvent systems for polyurethanes and bitumens being particularly problemmatical. Conventionally and preferably bitumen is soluble in gasoline hydrocarbons, such as white spirit, or in aromatic mineral oils and the like. Polyurethane prepolymers, e.g. based on polypropylene glycoldiol-diphenylmethane-4,4'-diisocyanate-polyadducts (PPG-MDI prepolymers) are, however, not soluble in such gasoline hydrocarbons and mineral oils. Other more or less polar solvents, such as chlorinated hydrocarbons, aromatic hydrocarbons, esters, ketones, etc., which might be considered as joint solvents are frequently unusable or undesirable due to solvent sensitivity with respect to materials the bitumens are used in connection with, i.e. expanded polystyrene foams, or due to health considerations in the workplace.

It was therefore not hitherto possible for the above reasons to combine (liquid) polyurethane prepolymers with (solid) bitumens in a one-component, solvent-free, storage-stable form (cf. e.g. Encyclopedia of Polymer Science and Technology, New York-London-Syndey, 1965, vol. 2 p. 423).

The aforementioned incompatibilities are accompanied by a chemically caused incompatibility, because it is thought that phenolic or other reactive groups of the bitumen react very rapidly with free isocyanate groups of the polyurethane prepolymer, which likely leads to aggregations and therefore to instabilities of such a polyurethane-bitumen system.

Two or one-component polyurethane-coal tar combinations in solvents have been known for some time. However, due to the highly carcinogenic nature of coal tar, such combinations now lack any practical significance (cf. e.g. British Patent 1,323,884).

An object of the present invention is therefore to provide a polyurethane-modified bitumen composition having properties superior to those of conventional bitumen compositions.

Another object is to avoid the aforementioned disadvantages and to protect the environment by providing a solvent-free or low-solvent polyurethane-modified bitumen.

A further object is to provide a polyurethane-modified bitumen as a one-component composition which is stable in storage.

Yet another object is to provide a polyurethane-modified bitumen foam composition.

SUMMARY OF THE INVENTION

According to the invention these objects are attained by a liquid, solvent-free or low-solvent, hardenable polyurethane-bitumen-plasticizer-one-component composition of the type described herein.

The invention also relates to a process for producing the inventive composition and the use of the inventive composition as an adhesive, sealant and coating compound. Preferred embodiments of the invention can be gathered from the following description and examples.

It has surprisingly been found that polyurethane prepolymers and bitumen can be processed to a liquid, storage-stable system when adhering to the weight ratios mentioned herein through the use of a specific combination of primary plasticizer and secondary plasticizer, said system being useful as an adhesive, sealant foam material or coating compound. A great advantage of the inventive composition is its variable viscosity behaviour. The compositions according to the invention adhere both to rigid and flexible materials (which is especially important in the case of bonded joints in the roof area) for bonding insulating materials based on expanded polystyrene foam (EPS foam), rigid polyurethane foams, mineral fibre mats with bitumen roofing sheets, etc., and on varnished or unvarnished steel sheets (so-called trapezoidal sheets). The inventive compositions are also suitable for the bonding, sealing or coating of concrete substrates, fibrous cement plates (previously asbestos cement plates), etc.

In addition, the inventive solvent-free or low-solvent polyurethane-bitumen-plasticizer compositions constitute true "cold bitumen systems" and consequently provide an alternative to conventional "hot bitumen systems".

An excellent primary plasticizer has proved to be butylurethane-formaldehyde-carbamic acid ester resin (BUFC resin), which is also suitable for flexibilizing distillate bitumen. This primary plasticizer (BUFC resin), which has an oily or soft resinous consistency and has good compatibility with dioldiisocyanate prepolymers, such as e.g. polypropylene glycoldiol-diphenylmethane-4,4'-diisocyanate polyadducts (PPG-MDI prepolymers for short) is conventionally only compatible with bitumen within narrow limits.

In order to be able to convert this limited compatibility for bitumen into an unlimited compatibility, it was necessary to discover a very good secondary plasticizer for bitumen, which simultaneously must have a good compatibility with the polyurethane prepolymer. 1-methyl-2,3-dibenzylbenzene (2,3-dibenzyltoluene) corresponding to the following formula

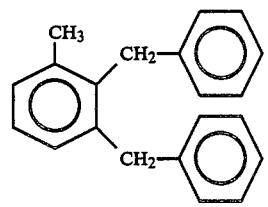

has proved to be particularly suitable.

The butylurethane-formaldehyde-carbamate resin used as the primary plasticizer according to the invention is a commerically available polycondensation product of butylcarbamate with formaldehyde and which has the following recurring segments:

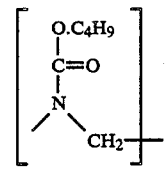

The inventive compositions, which can be adjusted to low, medium or high viscosity, are moisture-hardening and can e.g. be cured at ambient temperature (approximately 20° C.) and a relative atmospheric humidity of e.g. 50%. Hardening can alternatively take place at oven temperature (e.g. 60 minutes hardening at approximately 80° C.) or at even higher temperatures (e.g. 30 minutes hardening at approximately 180° C.). Thus the inventive compositions are complete liquid polyurethane-bitumen systems which cure in polyfunctional manner, without or with conventional hardener additions, either at ambient temperature through atmospheric humidity hardening, in the oven e.g. at 80° C., or stoved e.g. at 180° C. without there being any melting or running out of the bitumen fraction.

DETAILED DESCRIPTION

Reference is made to the introductory explanations with respect to the bitumens suitable for the purposes of the invention. According to the invention preference is given to distillate or blown bitumens which have completely satisfactory compatibility with 2,3-dibenzyltoluene.

Suitable polyurethane prepolymers are the polyether and/or polyester urethane prepolymers known for prepolymer applications. Preference is given to the use of dioldiisocyanate prepolymers and in particular polyether dioldiisocyanate prepolymers, prepared by reacting excess diisocyanate with polyethers. A special preference is given to polypropylene glycoldiol-diphenylmethane-4,4'-diisocyanate prepolymer (PPG-MDI prepolymer). The preferred polyether dioldiisocyanates are prepared from polyether diols, such as polypropylene glycol diol with a molecular weight between 1000 and 3000 and preferably around 2000 and in particular diphenylmethane-4,4'-diisocyanate. They have an NCO-value between 6 and 13% and an initial viscosity of approximately 10,000 mPa.s and have an excellent compatibility with BUFC resin. Polyester prepolymers suitable for the purposes of the invention are e.g. dicarboxylic acid ester-diol-diisocyanate prepolymers. Particular reference is made here to adipate-diol-diphenylmethane-4,4'-diisocyanate prepolymers.

The following examples wherein p.b.w. stands for parts by weight illustrate the invention:

EXAMPLE 1

| (a) | PPG-MDI prepolymer (NCO cont.: 6–13%, visc. 10000 mPa.s) | 25.00 p.b.w. |
|---|---|---|
| (b) | Distillate or blown bitumen (Penetration/25° C./1/10 mm 10–210) | 25.00 p.b.w. |
| (c) | BUFC soft resin | 25.00 p.b.w. |
| (d) | 2,3-dibenzyltoluene | 22.00 p.b.w. |
| (e) | Poly-MDI (NCO cont.: 31%) | 3.00 p.b.w. |
| | | 100.00 p.b.w. |

Ratio of binder:plasticizer = 50:50
Ratio of polyurethane:bitumen = 50:50
Viscosity measured at 20° C. with a Brookfield viscosimeter RVT with spindle 6: 10000 to 20000 mPa.s
Use: as primer, precoat, etc.

EXAMPLE 2

| (a) | PPG-MDI prepolymer | 30.00 p.b.w. |
|---|---|---|
| (b) | Distillate or blown bitumen | 30.00 p.b.w. |
| (c) | BUFC soft resin | 20.00 p.b.w. |
| (d) | 2,3-dibenzyltoluene | 17.00 p.b.w. |
| (e) | Poly-MDI | 3.00 p.b.w. |
| | | 100.00 p.b.w. |

Ratio of binder:plasticizer = 60:40
Ratio of polyurethane:bitumen = 50:50
Viscosity measured at 20° C. with a Brookfield viscosimeter RVT with spindle 6: 20000 to 30000 mPa.s
Use: as coating compound.

EXAMPLE 3

| (a) | PPG-MDI prepolymer | 35.00 p.b.w. |
|---|---|---|
| (b) | Distillate or blown bitumen | 35.00 p.b.w. |
| (c) | BUFC soft resin | 15.00 p.b.w. |
| (d) | 2,3-dibenzyltoluene | 12.00 p.b.w. |
| (e) | Poly-MDI | 3.00 p.b.w. |
| | | 100.00 p.b.w. |

Ratio of binder:plasticizer = 70:30
Ratio of polyurethane:bitumen = 50:50
Viscosity measured at 20° C. with a Brookfield viscosimeter RVT with spindle 6: 40000 to 50000 mPa.s
Use: as adhesive.

EXAMPLE 4

| (a) | PPG-MDI prepolymer | 40.00 p.b.w. |
|---|---|---|
| (b) | Distillate or blown bitumen | 40.00 p.b.w. |
| (c) | BUFC soft resin | 10.00 p.b.w. |
| (d) | 2,3-dibenzyltoluene | 7.00 p.b.w. |
| (e) | Poly-MDI | 3.00 p.b.w. |
| | | 100.00 p.b.w. |

Ratio of binder:plasticizer = 80:20
Ratio of polyurethane:bitumen = 50:50
Viscosity measured at 20° C. with a Brookfield viscosimeter RVT with spindle 6: 70000 to 90000 mPa.s
Use: as adhesive.

The inventive compositions are preferably produced in such a way that initially the polyurethane prepolymer is mixed with the BUFC resin. A solution of bitumen in 2,3-dibenzyltoluene is separately prepared. This is reacted at ambient temperature with a small amount of stabilizer in order to neutralize any phenolic or other reactive groups of the bitumen, or residual moisture, which could impair the storage stability of the system. Suitable stabilizers are e.g. acid chlorides, such as benzoyl chloride. According to a preferred embodiment of the invention the stabilizer used is a small amount (approximately 1 to 5%, preferably 3%) of diphenylmethane-4,4'-diisocyanate, it being possible to use commercially available products with oligomer or polymer fractions (poly-MDI) having a NCO content between 30 and 32%. Following a reaction time of approximately 30 minutes the solution of bitumen in 2,3-dibenzyltoluene is mixed with the mixture of polyurethane prepolymer and BUFC resin. Mixing of the components takes place in conventional manner, preferably at ambient temperature. Thus, conventional mixing vessels with stirrers or mixers are used. In order to ensure the necessary moisture exclusion, it is possible to work under an inert gas atmosphere or vacuum. Suitable mixing equipment is well known to the artisan.

The weight ratio of the polyurethane prepolymer to the bitumen should be in the range 70:30 to 30:70. This ratio is preferably approximately 50:50 (55:45 to 45:55). The ratio of polyurethane prepolymer+bitumen (binder) to the BUFC resin+2,3-dibenzyltoluene (plasticizer) should be in the range 40:60 to 90:10 and preferably 50:50 to 80:20. The weight ratio of the polyurethane prepolymer to the BUFC resin should be in the range 40:60 to 85:15 and preferably 50:50 to 80:20. Finally the weight ratio of bitumen to 2,3-dibenzyltoluene should be in the range 40:60 to 90:10 and preferably 50:50 to 85:15. The viscosity and flexibility of the inventive compositions can be adjusted by varying the binder to plasticizer ratio, as a function of the use requirements. It may be desirable to mix the compositions obtained in this way in per se known manner with organic or inorganic fibres or other suitable fillers, or with additional adhesion promoters, drying agents, corrosion inhibitors, etc., in order to obtain specific desired characteristics, such as stability, tack-freedom, adhesion, corrosion protection, thixotropy or the like. If certain setting effects or viscosity settings are required, it is possible to add to the solvent-free compositions according to the invention small amounts, (up to 10 and e.g. 5 to 10% by weight) of a suitable solvent, e.g. methylene chloride or the like.

It has been found that the characteristics of the inventive compositions can be modified particularly simply by adding an additive paste, e.g. to the compositions according to examples 1 to 4, this paste being a filler-pigment-plasticizer-adhesion promoter-drying agent mixture leading to a corresponding influencing of the individual chemical and/or physical characteristics of the inventive compositions. In this way it is possible to influence or modify the adhesion, low-temperature flexibility, viscosity and rheology and therefore the application method (coating, spraying, pouring), coating thickness, etc.

Suitable additive pastes are exemplied:

|   |   | a. | b. |
|---|---|---|---|
| 1. | Fillers, e.g. calcium carbonates | 60.5 | 62.5% |
| 2. | Pigments, e.g. carbon black | 2.5 | 2.5% |
| 3. | Plasticizers: | | |
|   | 3.1: BUFC soft resin | 25.0 | 20.0% |
|   | 3.2: 2,3-dibenzyltoluene | 5.0 | 10.0% |
| 4. | Adhesion promoters: | | |
|   | Keton resins | 2.5 | 1.5% |
|   | Cumarone-indene resins | 2.5 | 1.5% |
| 5. | Drying agents, e.g. 3 A molecular sieve | 2.0 | 2.0% |
|   |   | 100.0 | 100.0% |

The above additive pastes (a) or (b) can be widely varied. The preferred mixing ratio of binder to additive paste is 80:20 to 20:80.

Further, it is generally possible to process the inventive compositions to an open cell foam with a closed surface skin by adding about 5 to 15% by weight (based on 100% by weight of the inventive compositions) of a highly reactive liquid foaming agent. Mixtures of polypropylene glycol, surfactant, triethylene diamine and optionally water are suitable as foaming agents. Two typical formulations for suitable foaming agents are the following:

| Polypropylene glycol (NCO-scanvenger) | 25% | 33% |
|---|---|---|
| Surfactant (foam lamina forming agent) | 25% | 33% |
| Triethylenediamine (shock curing) | 25% | 34% |
| Water | 25% | — |
|   | 100% | 100% |

The foaming agent is very rapidly mixed in with a high speed mixing aggregate (mixing time less than 30 s). The foam then develops within 30 s to 2 min. and hardens during this time on the surface. The foam volume is about 400% by volume without the requirement of using any additional gases like fluorochlorohydrocarbons or the like. The weights per unit of volume are in the range of 250 to 260 kg/m$^3$ and can be lowered by at least a factor of 10, to about 20 to 30 kg/m$^3$, using foaming gases.

The foamed inventive compositions are very good materials for automobile body sound dampening. These properties of the foamed materials can be widely utilized, e.g. body construction/doors, trapezoid roof sheet metals etc. The cold/heat resistance of such foamed inventive material is at $-40°$ C./$+200°$ C., which is a very broad temperature range which could never be achieved with conventional bitumen materials. The loss factor (tan$\delta$) is about 0.5, which is considered a very good acoustic value. The modulus of elasticity at 20° C. is between $1 \times 10^6$ to $8 \times 10^5$ Pa.

When curing the inventive compositions under the influence of moisture a more or less intensive foaming depending on the relative humidity takes place. To avoid irregularities in the foam formation and thereby to achieve a more uniform foam product, the addition of a surfactant, preferable a non-ionic surfactant, in an amount of 0.1 to 2% by weight is recommended so as to achieve a weak to moderate foaming (up to about 100% by volume) during the subsequent hardening process. This measure has especially proved successful when using the inventive compositions as adhesives in the roof area.

Surprisingly it has been found that the inventive compositions are very compatible with about 0.1 to up to 15% by weight of linseed oil. The linseed oil can even partially replace the 2,3-dibenzyltoluene which leads to savings with regard to this plasticizer. Commercially available linseed oil containing siccative is well suited (e.g. linseed varnish). The advantage of such limited linseed oil additions is an adhesion improvement of the inventive compositions when applied to EPS foams or metal sheets.

In general terms, it is possible to use in the inventive compositions conventional additives such as solvents, adhesion promoters, corrosion inhibitors, drying agents, organic and/or inorganic fibres and/or fillers in widely varying quantities. Preference is given to weight ratios of binder to additives in the range 90:10 to 20:80. However, the incorporation of additives into the inventive compositions is only an optional measure, i.e. there is no need for such additives.

The preferred technical uses of the inventive compoitions are as follows:

(1) as an adhesive for bonding insulating materials, such as bitumen sheets, polystyrene foams, rigid polyurethane foams, mineral fibre mats, etc. to building materials such as concrete, fibrous cement plates, wood chip boards, varnished or unvarnished steel sheets (trapezoidal sheets), etc.;

(2) as sealants with joint-filling characteristics if atmospheric humidity has access for hardening purposes;

(3) as coating compounds with surface-covering coating of varnished steel sheets, e.g. as underbody protection or cavity sealing in the manufacture of cars.

Even in the case of the possible addition of small solvent quantities (5 to 10% by weight) highly concentrated or so-called high solid polyurethane-bitumen systems are still obtained.

Although the invention has been described in connection with preferred embodiments and specific examples, it is not so limited. Modifications within the scope of the following claims may be readily apparent to those skilled in the art.

I claim:

1. A liquid, foamable, hardenable polyurethane-modified bitumen composition, comprising
    (a) a polyether and/or polyester urethane prepolymer,
    (b) bitumen,
    (c) butylurethane-formaldehyde-carbamate resin,
    (d) 2,3-dibenzyltoluene, and
    (e) stabilizer,
    the weight ratio of (a) to (b) being in the range of 70:30 to 30:70, the weight ratio of (a)+(b) to (c)+(d) being in the range of 40:60 to 90:10, the weight ratio of (a) to (c) being in the range of 40:60 to 85:15 and the weight ratio of (b) to (d) being in the range of 40:60 to 90:10
    (f) up to 15% by weight of a foaming agent comprising propylene glycol, surfactant and triethylenediamine.

2. A foam composition according to claim 1 wherein the foaming agent further comprises water.

3. A liquid, foamable, hardenable composition according to claim 1 wherein the stabilizer (e) comprises diphenylmethane-4,4'-diisocyanate.

4. A liquid, foamable, hardenable composition according to claim 1 wherein the polyurethane prepolymer comprises a diol-diisocyante prepolymer.

5. A liquid, foamable, hardenable composition according to claim 1 wherein the polyurethane prepolymer comprises a polyether dioldiisocyanate prepolymer.

6. A liquid, foamable, hardenable composition according to claim 1, wherein the polyurethane prepolymer comprises polypropylene glycol diol-diphenylmethane-4,4'-diisocyanate.

7. A liquid, foamable, hardenable composition according to claim 1 wherein the bitumen comprises distillate bitumen or blown bitumen.

8. A liquid, foamable, hardenable composition according to claim 1 and further comprising about 0.1 to 15% by weight of linseed oil.

9. A liquid, foamable, hardenable composition according to claim 1 and further comprising about 1 to 10% by weight of organic solvent.

* * * * *